(12) United States Patent
Lee

(10) Patent No.: US 6,851,850 B1
(45) Date of Patent: Feb. 8, 2005

US006851850B1

(54) ELECTRONIC FEVER THERMOMETER

(75) Inventor: Yung Ku Lee, Taipei Hsien (TW)

(73) Assignee: Microlife Intellectual Property GmbH, Heerbrugg (CH)

( * ) Notice: Subject to any disclaimer, the term of this patent is extended or adjusted under 35 U.S.C. 154(b) by 0 days.

(21) Appl. No.: 09/401,167

(22) Filed: Sep. 21, 1999

(30) Foreign Application Priority Data

Nov. 11, 1998 (DE) ......................................... 298 20 206

(51) Int. Cl.⁷ ............................................. G01K 1/08
(52) U.S. Cl. ..................................... 374/208; 374/163
(58) Field of Search ................................. 374/163, 208, 374/194, 170, 161

(56) References Cited

U.S. PATENT DOCUMENTS

| | | | | |
|---|---|---|---|---|
| 4,037,470 A | * | 7/1977 | Mock et al. | 73/190 EW |
| 4,044,614 A | | 8/1977 | Beckman | 73/371 |
| 4,627,741 A | * | 12/1986 | Faller | 374/104 |
| 4,659,236 A | * | 4/1987 | Hobbs | 374/208 |
| 4,729,672 A | * | 3/1988 | Takagi | 374/208 |
| 4,743,121 A | | 5/1988 | Takagi et al. | 374/163 |
| 5,408,060 A | * | 4/1995 | Muurinen | 200/314 |
| 5,449,234 A | * | 9/1995 | Gipp et al. | 374/185 |
| 5,730,147 A | * | 3/1998 | Craig | 128/736 |
| 5,918,981 A | * | 7/1999 | Ribi | 374/162 |
| 5,966,108 A | * | 10/1999 | Ditzik | 345/74 |
| 5,975,724 A | * | 11/1999 | Pallanes | 362/310 |
| 6,074,741 A | * | 6/2000 | Murata et al. | 428/327 |
| 6,151,974 A | * | 11/2000 | Acht et al. | 73/866.5 |
| 6,241,903 B1 | * | 6/2001 | Savant et al. | 216/24 |

FOREIGN PATENT DOCUMENTS

| | | |
|---|---|---|
| DE | 27 54 090 | 6/1979 |
| DE | 34 15 598 A1 | 5/1985 |
| DE | 42 13 034 A1 | 10/1993 |
| EP | 0 41 186 A1 | 1/1991 |
| GB | 2148010 A | 5/1985 ............ G01K/7/00 |
| WO | WO 92/16821 | 10/1992 |
| WO | WO 97/21081 | 6/1997 |

OTHER PUBLICATIONS

Patent Abstracts of Japan, vol. 14, No. 327, Pub. No. 02111512, Apr. 24, 1990.
Patent Abstracts of Japan, vol. 1996, No. 5, Pub. No. 08009012, Jan. 12, 1996.
Patent Abstracts of Japan, vol. 1998, No. 13, Pub. No. 10221176, Aug. 21, 1998.
Patent Abstracts of Japan, vol. 1996, No. 5, Pub. No. 08003939, Jan. 9, 1996.
Patent Abstracts of Japan, vol. 17, No. 481, Pub. No. P–1604, Aug. 31, 1993.
Patent Abstracts of Japan, vol. 10, No. 76, Pub. No. P–440, Mar. 26, 1986.
Patent Abstracts of Japan, vol. 15, No. 296, Pub. No. P–1231, Jul. 26, 1991.
Patent Abstracts of Japan, vol. 10, No. 206, Pub. No. P–478, Jul. 18, 1986.
Patent Abstracts of Japan, Pub. No. 10048060A, Feb. 20, 1998.
Patent Abstracts of Japan, Pub. No. 07027626A, Jan. 31, 1995.
Patent Abstracts of Japan, Pub. No. 10221177A, Aug. 21, 1998.

* cited by examiner

*Primary Examiner*—Gail Verbitsky
(74) *Attorney, Agent, or Firm*—Dergosits & Noah, LLP

(57) ABSTRACT

An electronic fever thermometer includes a housing made of a transparent material, for example, transparent plastic. The housing includes a temperature sensor to measure the temperature, and a display element to display the measured temperature. The housing has a treated outer and/or inner surface so that the housing is essentially nontransparent to visible light. The housing also has an untreated viewing area. The display element is arranged within the housing adjacent to the viewing area.

12 Claims, 1 Drawing Sheet

ELECTRONIC FEVER THERMOMETER

CROSS-REFERENCE TO RELATED APPLICATION

This application claims the benefit and priority of German Application No. 298 20 206.9, entitled ELEKTRONISCHES FIEBERTHERMOMETER, filed on Nov. 11, 1998, and issued on Feb. 25, 1999, the disclosure of which is incorporated herein by reference.

BACKGROUND OF THE INVENTION

1. Field of the Invention

This invention relates generally to electronic fever thermometers.

2. Description of the Prior Art

Fever thermometers are used to measure the temperature of the human body. Ordinary mercury thermometers in which the temperature is determined by expansion of mercury, as well as electronic thermometers, are known. The temperature is converted to an electrical signal in an electronic thermometer by an electronic component. Heat-dependent electrical resistors are generally used.

Such fever thermometers must meet various requirements primarily when used in the clinical field.

Since thermometers are often destroyed or stolen, the lowest possible manufacturing costs must be considered. Such thermometers must also have a surface that is easy to disinfect and one that exhibits the least possible vulnerability to breakage, as well as guarantee good watertightness and reliable function.

Ordinary mercury thermometers in which the mercury column is integrated in a glass enclosure have satisfactorily met these requirements thus far. However, a problem in mercury thermometers is the toxicity of mercury. Old mercury thermometers are in large part responsible for the amounts of mercury deposited in the environment (for example, at landfills).

Thermometers with gallium solutions are also known. However, such thermometers are relatively expensive and are not unobjectionable in terms of toxicity. The temperature display must also be reset by shaking, which requires considerable expenditure of force in the light gallium solutions.

Ordinary electronic fever thermometers are beset with the drawback that breaks in the surface exist between the housing and the opening inserted in it for the viewing temperature reading, which poses problems with respect to sealing and disinfectability.

An electronic fever thermometer is known from DE 42 13 034, which has a hermetically sealed, air-permeable, windowless bulb in which a solar cell is provided as the power supply. A shortcoming of this thermometer is that the manufacturing and material costs are too high. Moreover, the electronic components are visible, which imparts an unattractive appearance to the thermometer.

An electronic fever thermometer is also known from WO 92/16821, which has a hermetically sealed glass housing. The visibility of the electronic components, as well as the vulnerability to breakage, are also a drawback of this known thermometer.

OBJECTS AND SUMMARY OF THE INVENTION

The task of the present invention is to avoid the drawbacks of the known solutions, especially to devise a fever thermometer that can be simply and economically produced, which guarantees optimal watertightness and is simple to clean and disinfect. The fever thermometer should also be reliable during long-term use.

The electronic fever thermometer according to the present invention consists essentially of a housing made of a transparent material, preferably a transparent plastic. Plastic is preferred with respect to the manufacturing method and with respect to fracture resistance.

Transparent or opaque is defined as objects that are visible or not visible, respectively, through the material. A translucent, milky surface is nontransparent according to this definition, since light only shines through diffusely. The housing is provided with a temperature sensor to measure the temperature and a display element to display the measured temperature.

The housing according to the invention has an outer and/or inner surface, which is machined, preferably structured, so that the housing is essentially nontransparent to visible light. The housing is not machined in at least one viewing area and is therefore transparent. The display element is arranged in the interior of the housing adjacent to the viewing area. Owing to the treated outer and/or inner surface the housing is essentially nontransparent so that the components in the interior of the thermometer are not apparent. Only in the region of the display element is the housing transparent. An essentially nontransparent housing can therefore be produced in one piece without having to use a viewing window separately in the area of the display element, as in known fever thermometers. On the one hand, this permits more economical manufacture. On the other hand, owing to the smooth surface without joints, disinfection of the fever thermometer is simpler and guarantees watertightness. In addition, costly coating (not resistant during use) of the surface with paint or another coating is avoided.

The viewing area and display element are designed essentially congruent, i.e., they have roughly the same shape and area.

The housing can be made in one piece from transparent plastic material. The housing is preferably produced from polycarbonate (PC) in an injection molding process.

The housing is also preferably provided with a metal tip that can be glued into the housing. The temperature sensor in this case is arranged within this metal tip. The metal tip permits rapid heat transfer between the tissue whose temperature is to be measured and the temperature sensor.

The display element preferably consists of an LCD display. Energy consumption can thus be kept relatively low. However, other means of display, for example, LED displays or non-numerical displays, are conceivable.

Both the outer surface of the housing and the inner surface of the housing or the outside and inside surface of the housing can be machined according to the invention. Treatment can occur during the manufacturing process in the injection molding process in a die, whose surfaces are mechanically and/or chemically treated. In particular, the surfaces of the die can be roughened by grinding, treatment with a blasting abrasive or etching. However, it is also possible to subsequently treat the surfaces of the housing or to apply a coating, for example, paint.

A roughened inner surface has the advantage that the outer surface can be left smooth. A smooth surface is more pleasant for the user.

The electronic fever thermometer is provided with a battery. A long-term battery is preferably used, which is advantageously welded unreplaceably into the housing. The watertightness is thus increased and the reliability of the fever thermometer improved. The fever thermometer is thus designed as a disposable thermometer. The battery is preferably welded into the housing. This design also has a positive effect in terms of manufacturing costs. The battery cover, moving contacts and the like can be dispensed with.

The electronic fever thermometer is also preferably provided with a switch. The switch can be inserted in an opening of the housing and sealed. A flexible membrane or O-ring seal, for example, can be used for sealing, beneath which a contact element is arranged. Other variants, for example, with contactless switches, are also conceivable.

These and other objects, features and advantages of the present invention will be apparent from the following detailed description of illustrative embodiments thereof, which is to be read in connection with accompanying drawing.

DETAILED DESCRIPTION OF THE PREFERRED EMBODIMENTS

Figure 1:
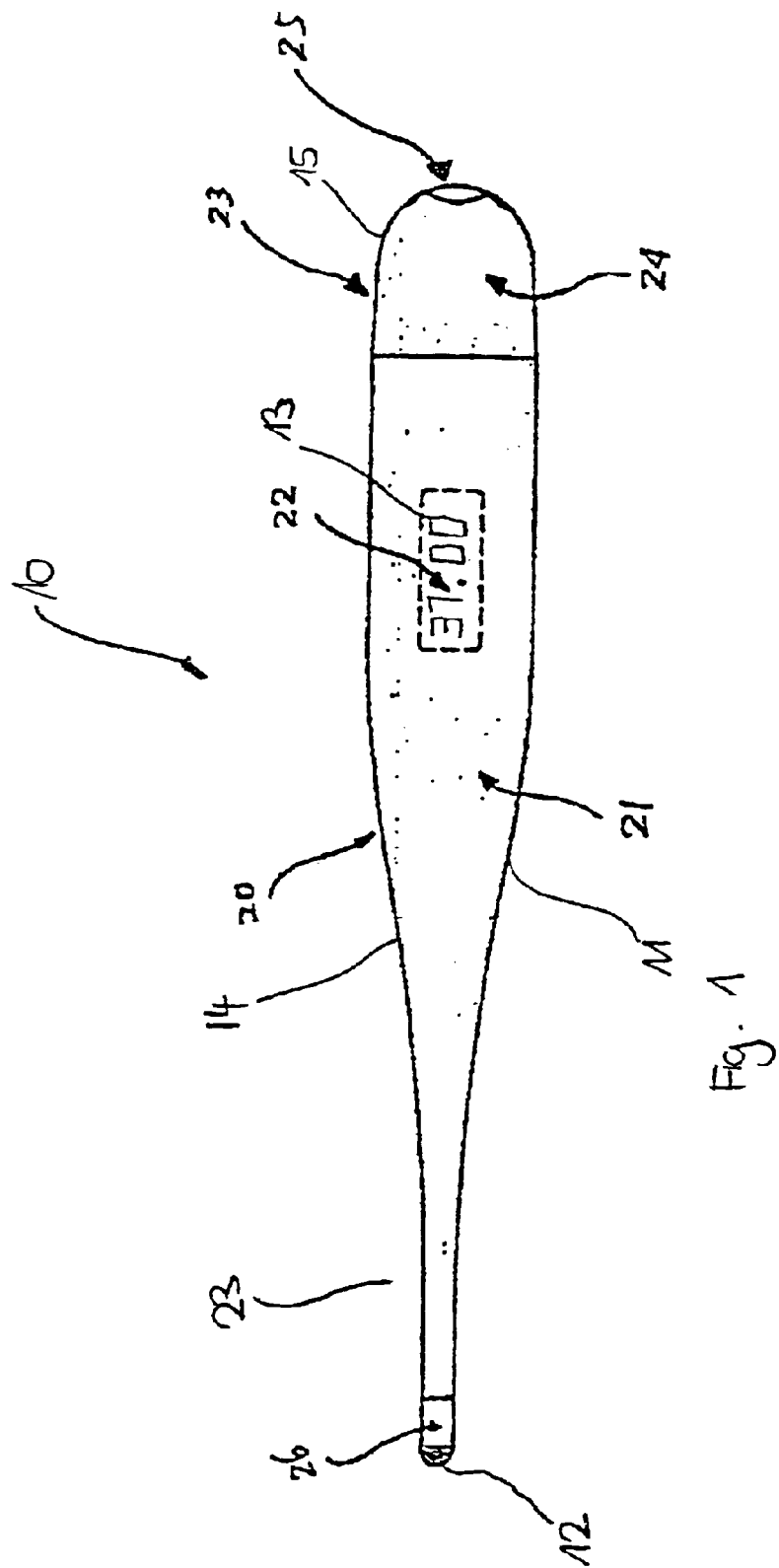
FIG. 1 shows an electronic fever thermometer according to the invention.

The electronic fever thermometer 10 consists essentially of a housing 11. The housing tapers on one side to a tip 23. A metal housing 26 is arranged on tip 23, preferably glued into the housing. A temperature sensor 12 for measurement of the temperature is provided in the interior of metal housing 26. The metal tip facilitates heat transport between the tissue whose temperature is to be measured and the temperature sensor 12.

The housing 11 is also provided with a switch 25. The switch 25 is inserted in an opening on housing 11. The housing can consist of a main part 14 and a battery cover 15. The battery cover 15 is preferably welded tight to the main part 14 so that watertightness is guaranteed.

A battery (not shown) is inserted into housing 11. The main part 14 and the battery cover 15 are then permanently welded to each other. Before welding, the other electronic components essential for operation are also inserted into housing 11. In particular, these are the temperature sensor 12, electrical connections (not shown) that connect the temperature sensor 12 to a control circuit (also not shown), as well as a display element 13 to display the measured temperature. These individual components are known to one skilled in the art and need not be described in detail.

The housing 11 has an outside surface 20 and an inside surface 21. At least one of these two surfaces is structured so that the housing, which consists of a transparent plastic material, is essentially nontransparent. The battery cover is also preferably treated on the inside surface 24 and/or outside surface 23 so that it is not transparent.

The display element 13 is designed as an LCD display. The LCD display is arranged beneath a viewing area 22 on housing 11. The viewing area 22 defines a section in housing 11 that is transparent to visible light. It is therefore guaranteed in simple fashion that the housing 11 is essentially nontransparent, but is transparent in the region of display element 13, where this is required.

The manufacturing method for the fever thermometer according to the invention is configured as simply as possible when the main part 14 of housing 11 and the battery cover 15 are produced in the first step in one piece from plastic material, in which the surface of the injection molding die is treated so that at least one of the surfaces of the part is structured. The structure in the outside and/or inside surface means that light is scattered diffusely and the housing becomes nontransparent.

To simplify the method the main part 14 and battery cover 15 are treated over the entire surface so that initially no transparent regions are present. The viewing area 22 can then be produced by polishing. However, it is also conceivable to spare one part of the surface of the die of housing 11 from treatment, for example, by covering.

Treatment of the die surfaces can occur mechanically or chemically. In the preferred practical example, the structured surface is produced by etching of the injection molding die surface.

The individual components of the fever thermometer are then attached to main part 14. The temperature sensor 12 and metal tip 26 are glued into the tapering tip 23 and the display element 13 is inserted with the necessary wiring and control electronics. A battery (not shown) with corresponding contacts is then connected and inserted. Finally, the housing 11 is hermetically sealed by welding on battery cover 15. Roughening of the surfaces of housing 11 can occur before or after closure of housing 11. Welding of the two parts preferably occurs by ultrasonic welding. It would also be conceivable to subject the individual parts after injection molding to a separate working step for surface treatment.

Although illustrative embodiments of the present invention have been described herein with reference to the accompanying drawing, it is to be understood that the invention is not limited to those precise embodiments, and that various other changes and modifications may be effected therein by one skilled in the art without departing from the scope or spirit of the invention.

What is claimed is:

1. An electronic thermometer comprising:
   a temperature sensor;
   an electronic circuit coupled to the temperature sensor to process temperature data measured by the temperature sensor;
   a display element coupled to the electronic circuit to display a temperature corresponding to the temperature data measured by the temperature sensor;
   a unitary housing enclosing the electronic circuit and display element, and formed of a single piece of material, the housing having
      an inner surface and an outer surface,
      a viewing area disposed proximate the display element, and with a first surface treatment on at least one of the inner and outer surface, wherein the first surface treatment allows the display element to be visible through the housing, and
      a substantially nontransparent area surrounding the viewing area and having a second surface treatment on at least one of the inner and outer surface, wherein the second surface scatters light diffusely through the housing and causes the electronic circuit to be less visible than the display element through the housing; and
   a metal tip attached to an end of the housing and enclosing the temperature sensor.

2. The electronic thermometer of claim 1 wherein the substantially nontransparent area is produced by etching a first portion of an injection molding die used in an injection molding system utilized to form the housing, prior to injection of the transparent material in the die.

3. The electronic thermometer of claim 2 wherein the viewing area is produced by leaving a second portion of the injection molding die in an un-etched state, prior to injection of the transparent material in the die.

4. The electronic thermometer of claim 2 wherein the first portion of the injection molding die is produced by mechanical etching of an injection molding die surface.

5. The electronic thermometer of claim 2 wherein the first portion of the injection molding die is produced by chemical etching of the injection molding die surface.

6. The electronic thermometer of claim 1 wherein the viewing area is produced by polishing a sub-portion of the substantially nontransparent area.

7. The electronic thermometer of claim 1 further comprising a battery welded into the housing to provide power to the electronic circuit and display element.

8. The electronic thermometer of claim 1 wherein the viewing area and display element are substantially congruent.

9. The electronic thermometer of claim 7, further comprising a battery cover welded to the housing.

10. The electronic thermometer of claim 8, wherein the display element includes an LCD display.

11. The electronic thermometer of claim 10 further comprising a switch coupled to the battery and the electronic circuit.

12. The electronic thermometer of claim 1, wherein the housing further comprising a main part and a cover part are made from polycarbonate.

* * * * *